United States Patent
Demir

(10) Patent No.: US 9,626,409 B2
(45) Date of Patent: *Apr. 18, 2017

(54) ADAPTING A RELATIONAL QUERY TO ACCOMMODATE HIERARCHICAL DATA

(71) Applicant: International Business Machines Corporation, Armonk, NY (US)

(72) Inventor: Suavi A. Demir, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/658,742

(22) Filed: Mar. 16, 2015

(65) Prior Publication Data

US 2015/0356139 A1 Dec. 10, 2015

Related U.S. Application Data

(63) Continuation of application No. 14/299,678, filed on Jun. 9, 2014.

(51) Int. Cl.
*G06F 17/30* (2006.01)
(52) U.S. Cl.
CPC .. *G06F 17/30448* (2013.01); *G06F 17/30427* (2013.01); *G06F 17/30451* (2013.01); *G06F 17/30589* (2013.01); *G06F 17/30595* (2013.01)

(58) Field of Classification Search
USPC .................................................. 707/765, 801
See application file for complete search history.

(56) References Cited

U.S. PATENT DOCUMENTS 5,734,893 A * 3/1998 Li ..................... G06F 17/30247
382/203
8,359,495 B2 * 1/2013 Candea ................. G06F 11/008
714/26

(Continued)

FOREIGN PATENT DOCUMENTS

WO WO2013116806 8/2013

OTHER PUBLICATIONS

Spi Dst et al.; "Program Development by Query"; an IP.com Prior Art Database Technical Disclosure; http://ip.com/IPCOM/000148802D; Mar. 30, 2007.

(Continued)

*Primary Examiner* — Kim Nguyen
(74) *Attorney, Agent, or Firm* — Steven M. Greenberg, Esq.; CRGO Law

(57) ABSTRACT

A method, system and computer program product for processing hierarchical data is provided. A method for processing hierarchical data in a relational database includes receiving an input parameter in an initial query for querying an array in a hierarchical data object stored in a table of a relational database, and transforming the initial query into a transformed query configured to place all elements of the array into a different table and to apply a sub-query against the table for the input parameter. Once transformed, predicate evaluation logic of a relational engine of the relational database is applied to the transformed query that is then mapped to the initial query. Finally, responsive to receiving a subsequent instance of the initial query, the mapping is referred to in order to replace the initial query with the transformed query and to subsequently apply the predicate evaluation logic to the transformed query.

4 Claims, 2 Drawing Sheets

(56) References Cited

U.S. PATENT DOCUMENTS

| | | | |
|---|---|---|---|
| 8,527,532 B2* | 9/2013 | Serban | G06F 17/30448 |
| | | | 707/759 |
| 9,116,932 B2* | 8/2015 | Zhou | G06F 17/30292 |
| 9,230,040 B2* | 1/2016 | Shukla | G06F 17/30964 |
| 2010/0211572 A1 | 8/2010 | Beyer et al. | |
| 2011/0040723 A1* | 2/2011 | O'Donnell | G06F 17/30539 |
| | | | 707/603 |
| 2012/0117141 A1 | 5/2012 | Beaver et al. | |
| 2013/0198237 A1* | 8/2013 | Serban | G06F 17/30557 |
| | | | 707/792 |
| 2015/0142773 A1* | 5/2015 | Mindnich | G06F 17/30466 |
| | | | 707/714 |
| 2015/0356140 A1* | 12/2015 | Demir | G06F 17/30451 |
| | | | 707/765 |

OTHER PUBLICATIONS

Anonymously; "Data Driven Method to Access Stored Data in an Implementation Invariant Manner"; An IP.com Prior Art Database Technical Disclosure; http://ip.com/IPCOM/000210950.

* cited by examiner

ADAPTING A RELATIONAL QUERY TO ACCOMMODATE HIERARCHICAL DATA

BACKGROUND OF THE INVENTION

Field of the Invention

The present invention relates to hierarchical data representation in a computer program and more particularly to processing hierarchical data processing in a relational database management system.

Description of the Related Art

Hierarchical data refers to a data structure defining data objects of a one-to-many relationship in which a parent object can have one or more children, but each child can have only one parent. Commonly envisioned as a tree, hierarchical data remains an important tool in modeling real world object relationships. Relational data, in the other hand, is best known as the basis for the relational model of database management in which all data is represented in terms of tuples, and grouped into relations so as to permit access according to first-order predicate logic. A database organized in terms of the relational model is a relational database which, in most cases, use the structured query language (SQL) data definition and query language. To that end, a table in an SQL database schema corresponds to a predicate variable; the contents of a table to a relation; key constraints, other constraints, and SQL queries correspond to predicates.

The Javascript Object Notation (JSON) is a form of hierarchical data representation. JSON is built upon a collection of name/value pairs and an ordered list of values. In JSON, a hierarchical data object includes an unordered set of name/value pairs and is denoted with a beginning left brace and an ending right brace. Each name in a JSON object is followed by a colon and the name/value pairs are separated by a comma. Of note, a JSON object can include one or more of the name/value pairs such that the name/value pairs include but a single value. Yet, a JSON object also can include a name/value pair that includes an array of values for a single name.

Of note, JSON has been viewed as a universal data representation able to be integrated in a multiplicity of programming languages. Yet, integrating JSON within a relational database is not without its challenges. Specifically, while a scalar value can be retrieved from a JSON object utilizing the "JSON VAL" function by reference to a name corresponding to the value, retrieving a value amongst a set of values in an array in a JSON is more complicated. One possible solution is to pre-specify which element of an array is desirable, but to do so would require a priori a number of elements in the array. Another possible solution is to utilize a SQL table function that can return each array element as a separate row to the relational database. Both solutions, however, cannot be indexed and therefore are not satisfactory.

The problem of processing array values in a JSON document can become compounded in attempting to process hierarchical relationships. In this instance, a function call first is required to return a set of records containing the values for the hierarchical relationship. Thereafter, an index must be built on the result set and sorted to provide ready identification of the hierarchical relationship. In doing so, however, it can be imperative to ensure type conformity so as to handle an exception during the sorting portion of the process.

BRIEF SUMMARY OF THE INVENTION

Embodiments of the present invention address deficiencies of the art in respect to relational database management and provide a novel and non-obvious method, system and computer program product for processing hierarchical data in a relational database. In one embodiment of the invention, a method for processing hierarchical data, such as data in a JSON object, in a relational database includes receiving an input parameter in an initial SQL query for querying an array in a hierarchical data object stored in a table of a relational database, and transforming the initial SQL query into a transformed SQL query configured to place all elements of the array into a different table and to apply a sub-query against the table for the input parameter. Once transformed, predicate evaluation logic of a relational engine of the relational database is applied to the transformed SQL query and the transformed SQL query is then mapped to the initial SQL query. Finally, responsive to receiving a subsequent instance of the initial SQL query, the mapping can be referred to in order to replace the initial SQL query with the transformed SQL query and to subsequently apply the predicate evaluation logic of the relational engine to the transformed SQL query.

In one aspect of the embodiment, the elements of the array are explicitly typecast to a specified data type, for instance an integer data type, and in response to detecting a failure of the typecasting, a NULL value is returned to the relational engine. As well, a character size of the elements of the array can be limited to a specified width. Thereafter, in response to detecting an element of the array having a character size that exceeds the specified width, a NULL value is returned to the relational engine. In this way, the hierarchical data within a JSON object can be handled in the relational engine despite the possibility that the value of the array of the JSON object is of an unexpected data type or exceeds a certain character width.

In another embodiment of the invention, a relational database data processing system is provided. The system includes a host computing system comprising at least one computer with memory and at least one processor. The system also includes fixed storage disposed in the host computing system and a relational database stored in the fixed storage, the relational database storing a different hierarchical data objects. The system yet further includes a relational engine executing in the memory of the host computing system and managing queries upon the hierarchical data objects of the relational database. Finally, the system includes a hierarchical data processing module coupled to the relational engine.

The module includes program code enabled upon execution in the memory of the host computing system to receive an input parameter in an initial query for querying an array in a hierarchical data object stored in a table of the relational database. The program code also is enabled to transform the initial query into a transformed query configured to place all elements of the array into a different table and to apply a sub-query against the table for the input parameter. The program code yet further is enabled to direct the relational engine to apply predicate evaluation logic of the relational engine to the transformed query, and to map the transformed query to the initial query. Finally, the program code is enabled to respond to receiving a subsequent instance of the initial query, by referring to the mapping to replace the initial query with the transformed query and by subsequently directing the relational engine to apply the predicate evaluation logic to the transformed query.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for processing hierarchical data in a relational database. In accordance with an embodiment of the invention, an initial query can be received which specifies a request to extract an array element in an array from a hierarchical data object disposed in a table of a relational database. The initial query can be transformed into a query that extracts all elements of the array into a different table and the transformed query can be applied by the relational engine of the relational database. The transformed query thereafter can be mapped to the initial query such that a subsequent invocation of the initial query can be replaced with the transformed query and applied by the relational engine. In this way, optimal query performance can be achieved for all subsequent invocations of the initial query.

Figure 1:
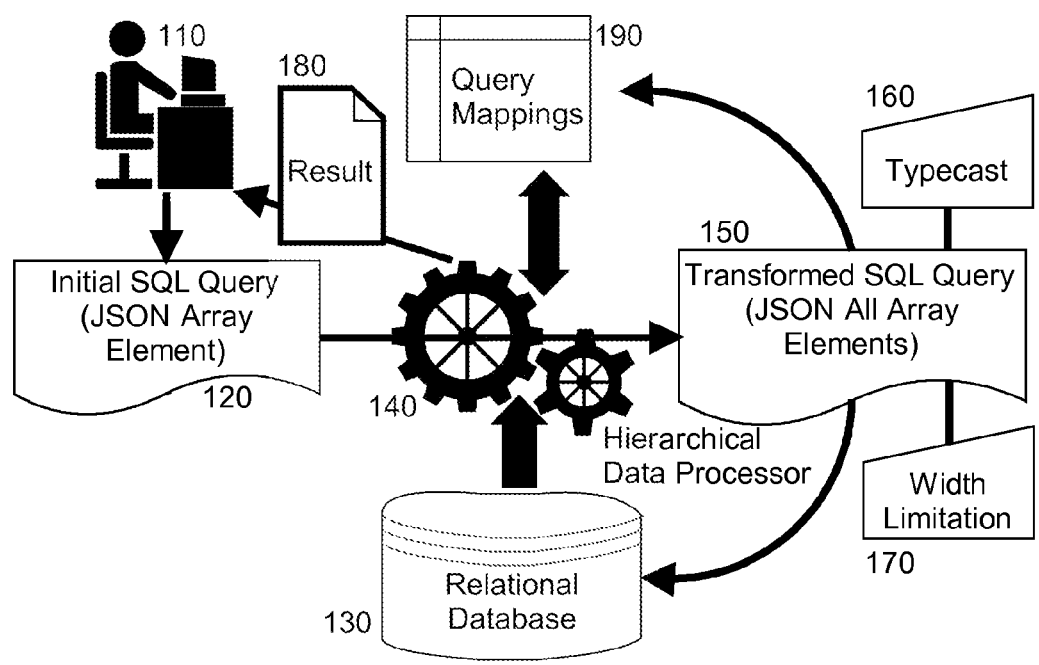
FIG. 1 is a pictorial illustration of a process for processing hierarchical data in a relational database.

In further illustration, FIG. 1 pictorial shows of a process for processing hierarchical data in a relational database. As shown in FIG. 1, an end user 110 can issue an initial SQL query 120 to a relational database 130 in order to retrieve a particular array element of an array within a hierarchical data object such as a JSON object disposed within the relational database 130. Hierarchical data processor 140 can receive the initial SQL query 120 and the hierarchical data processor 140 can transform the initial SQL query 120 into a transformed SQL query that seeks to retrieve all of the elements of the array within the hierarchical data object, and then sub-select amongst all of the elements. Optionally, a typecast 160 can be applied to the elements so as to manage any type mismatches in the array. Further, a width limitation 170 can be applied to the elements so as to manage any data mismatches in the array.

Once the hierarchical data processor 140 has transformed the initial SQL query 120 into the transformed SQL query 150, the hierarchical data processor 140 can direct a relational engine managing access to the relational database 130 to apply the transformed SQL query 150 so as to produce a result set 180 for presentation to the end user 110. Additionally, the hierarchical data processor 140 can store a mapping 190 of the initial SQL query 120 to the transformed SQL query 150. In this way, subsequent invocations of the initial SQL query 120 can be replaced with the transformed query 150 without requiring a new transformation of the initial SQL query 120.

Figure 2:
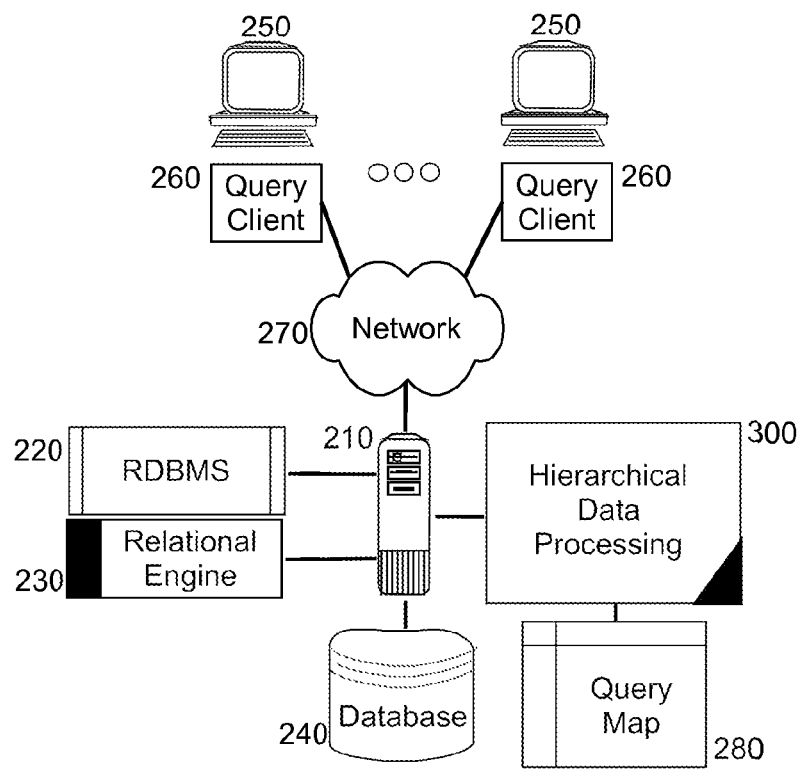
FIG. 2 is a schematic illustration of a relational database data processing system configured for processing hierarchical data in a relational database.

The process described in connection with FIG. 1 can be implemented in a relational database data processing system. In yet further illustration, FIG. 2 schematically shows a relational database data processing system configured for processing hierarchical data in a relational database. The system includes a host computing system 210 that includes one or more computing servers, each with memory and at least one processor. The host computing system 210 can support the operation of a relational database management system 220 managing access to a relational database 240 by way of a relational engine 230 configured to process SQL queries received from one or more query clients 260 executing in respectively different client computers 250 from over computer communications network 270, against the data in one or more tables of the relational database 240.

Notably, a hierarchical data processing module 300 can execute in the memory of the host computing system 210. The hierarchical data processing module 300 can include program code that when executed in the memory of the host computing system 210 is enabled to process an initial SQL query received in the relational engine 230, the initial SQL query seeking an element of an array of a JSON object. The processing performed by the program code transforms the initial SQL query into a transformed SQL query seeking to place all elements of the array of the JSON object into a table and the sub-selection of the desired element from the table. The processing performed by the program code also maps the initial SQL query to the transformed SQL query in a query map 280 so that subsequent instance of the initial SQL query can be immediately replaced with the transformed SQL query. Finally, the processing performed by the program code can direct the relational engine 230 to apply the transformed SQL query to the relational database 240.

Figure 3A:
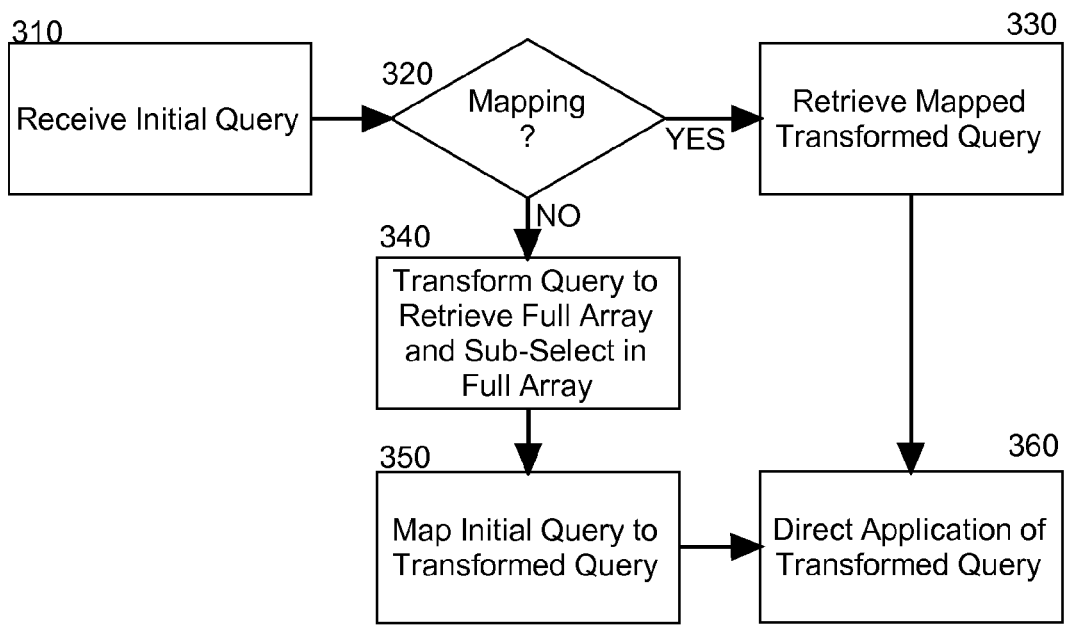
FIG. 3A is a flow chart illustrating a process for query transformation to accommodate hierarchical data in a relational database; and, FIG. 3B is a flow chart illustrating a process for imposing data limitations upon hierarchical data disposed within a relational database.

In even yet further illustration of the operation of the hierarchical data processing module 300, FIG. 3A is a flow chart illustrating a process for query transformation to accommodate hierarchical data in a relational database. Beginning in block 310, an initial SQL query can be received to access an element of an array of a JSON object stored in the relational database. In decision block 320, it can be determined whether or not a transformed SQL query has been previously mapped to the initial SQL query. If so, in block 330 the previously mapped transformed SQL query can be retrieved and the relational engine can be directed to apply the transformed SQL query in block 360.

In decision block 320, however, if no previous mapping exists for the initial SQL query, in block 340 the initial SQL query can be transformed into a transformed SQL query by specifying a retrieval of all elements of the array of the JSON object into a table and the subsequent selection of the desired element from amongst the entries in the table. Thereafter, in block 350 the initial SQL query can be mapped to the transformed SQL query. Finally, the relational engine can be directed to apply the transformed SQL query in block 360.

Figure 3B:
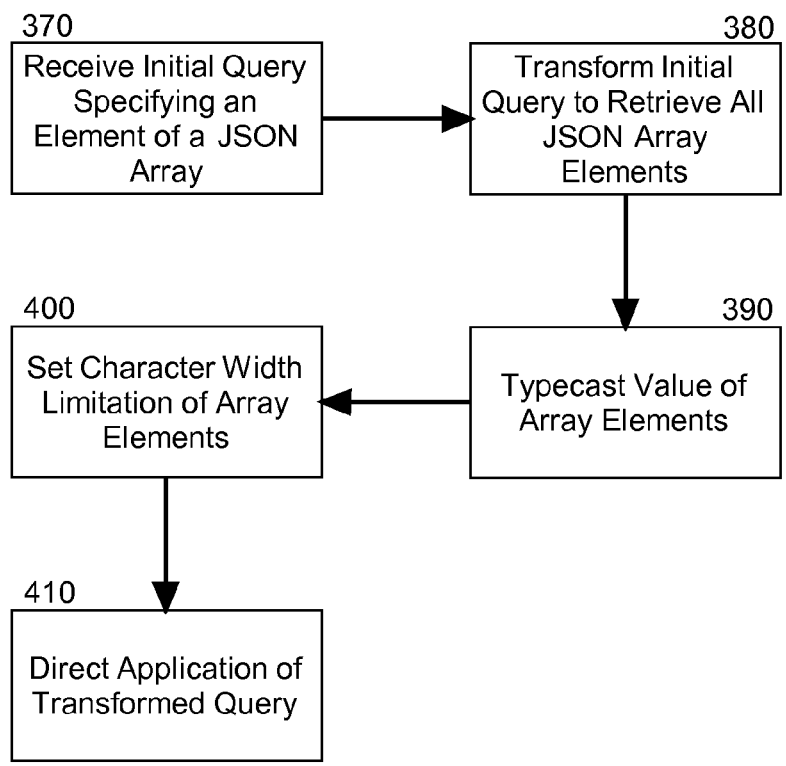

Of note, so as to accommodate the hierarchical data of the JSON object, typecasting and value constraints can be applied to the elements of the array of the JSON object. In even yet further illustration, FIG. 3B is a flow chart illustrating a process for imposing data limitations upon hierarchical data disposed within a relational database. Beginning in block 370, an initial SQL query can be received specifying a single element of an array of a JSON object disposed within the relational database. In block 380, the initial SQL query can be transformed into a transformed SQL query that specifies the retrieval of all elements of the array of the JSON object into a table. In block 390, a value of at least one field of the array can be typecast to a particular data type. Further, in block 400 a limitation of character width can be specified as a constraint to a value of at least one field of the array. Thereafter in block 410 the relational engine can be directed to apply the transformed query to the JSON object of the relational database.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for processing hierarchical data in a relational database comprising:
   receiving an input parameter in an initial query for querying an array in a hierarchical data object stored in a table of a relational database;
   transforming the initial query into a transformed query configured to place all elements of the array into a different table and to apply a sub-query against the table for the input parameter;
   explicitly typecasting, by the device, the elements of the array to a specified data type and responding to a failure of the typecasting by returning, by the device, a NULL value to the relational engine, and limiting, by the device, a character size of the elements of the array to a specified width and responding to an element of the array having a character size that exceeds the specified width by returning, by the device, a NULL value to the relational engine;
   applying predicate evaluation logic of a relational engine of the relational database to the transformed query;
   mapping the transformed query to the initial query; and,
   responsive to receiving a subsequent instance of the initial query, referring to the mapping to replace the initial query with the transformed query and subsequently applying the predicate evaluation logic of the relational engine to the transformed query.

2. The method of claim 1, wherein the hierarchical data object is a Javascript Object Notation (JSON) object.

3. The method of claim 1, wherein the initial query and the transformed query are structured query language (SQL) queries.

4. The method of claim 1, wherein the specified data type is an integer data type.

* * * * *